United States Patent
Thiele et al.

(10) Patent No.: US 7,370,780 B2
(45) Date of Patent: May 13, 2008

(54) ROOF RACK COVER ATTACHMENT SYSTEM AND METHOD

(75) Inventors: Steven Thiele, Marysville, OH (US); Narumichi Nishimura, Dublin, OH (US); Christopher Salvador, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 469 days.

(21) Appl. No.: 10/838,610

(22) Filed: May 4, 2004

(65) Prior Publication Data

US 2004/0262346 A1 Dec. 30, 2004

Related U.S. Application Data

(60) Provisional application No. 60/470,348, filed on May 14, 2003.

(51) Int. Cl.
*B60R 9/00* (2006.01)
(52) U.S. Cl. .................. 224/326; 224/309; 224/321
(58) Field of Classification Search .............. 224/326, 224/322, 309, 317, 325, 328, 329; 410/77; 296/153, 146.7; 220/4.24, 324; 455/352, 455/128; 348/114
See application file for complete search history.

(56) References Cited

U.S. PATENT DOCUMENTS

| 4,279,368 | A |   | 7/1981  | Kowalski |
|-----------|---|---|---------|----------|
| 4,341,332 | A | * | 7/1982  | Kowalski et al. ........... 224/326 |
| 5,016,799 | A |   | 5/1991  | Stapleton |
| 5,326,007 | A |   | 7/1994  | Pudney et al. |
| 5,452,831 | A |   | 9/1995  | Linnhoff |
| 5,573,159 | A |   | 11/1996 | Fisch et al. |
| 5,588,572 | A | * | 12/1996 | Cronce et al. ............. 224/321 |
| 5,765,737 | A |   | 6/1998  | Cucheran et al. |
| 5,979,723 | A |   | 11/1999 | Tress et al. |
| 6,050,466 | A | * | 4/2000  | Cronce et al. ............. 224/321 |
| 6,234,558 | B1 | * | 5/2001 | Curtindale ................ 296/97.9 |
| 6,338,428 | B1 |   | 1/2002 | Kawasaki et al. |

* cited by examiner

*Primary Examiner*—Nathan J. Newhouse
*Assistant Examiner*—Corey N Skurdal
(74) *Attorney, Agent, or Firm*—Rankin, Hill & Clark LLP; Mark E. Duell

(57) ABSTRACT

The present invention is directed to a roof rack for mounting to a vehicle. The roof rack includes a rail secured between first and second stanchions. The first stanchion includes a cover and a base. The cover is releasably secured to the base by a plurality of fastener assemblies. One of the fastener assemblies is formed by a tongue of the base being disposed in a loop of the cover.

13 Claims, 4 Drawing Sheets

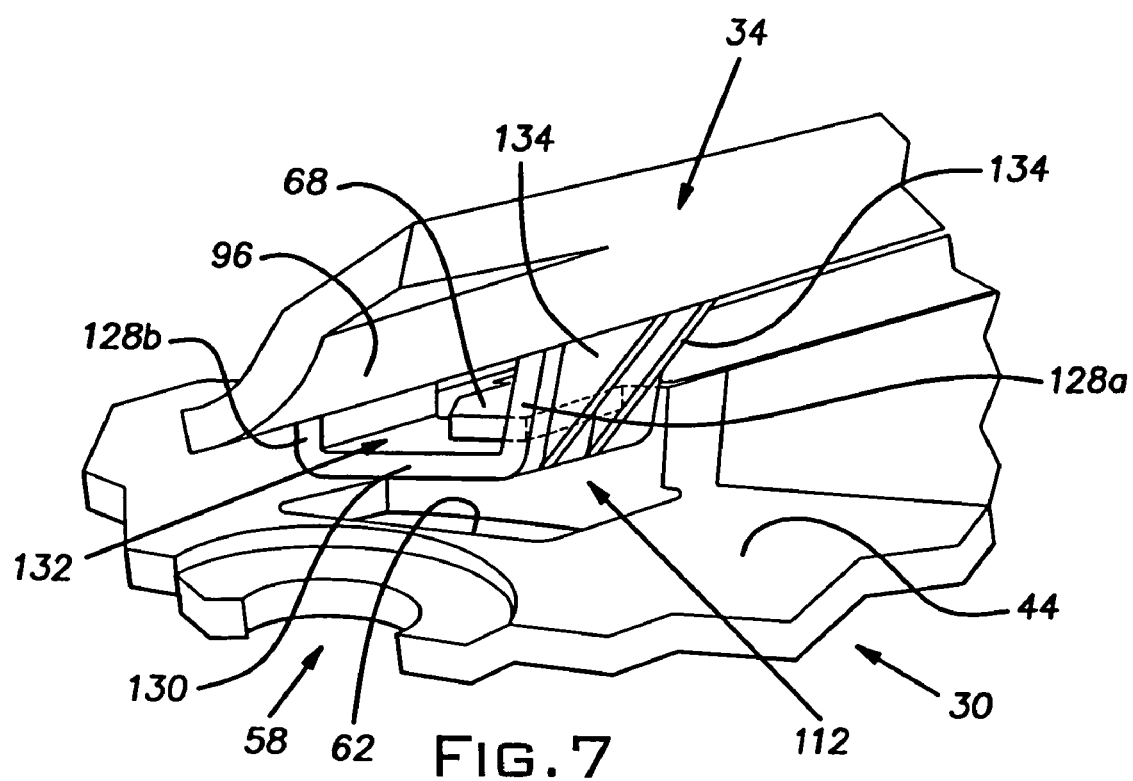

ROOF RACK COVER ATTACHMENT SYSTEM AND METHOD

CROSS REFERENCE TO RELATED APPLICATION

This application claims the benefit of priority to U.S. Provisional Application Ser. No. 60/470,348 filed May 14, 2003, which is herein incorporated by reference.

BACKGROUND OF THE INVENTION

The present invention relates to roof racks for vehicles and more specifically to cover systems for such roof racks.

Conventionally, a roof rack for a vehicle includes at least two spaced apart parallel rails that extend laterally or longitudinally along a roof of a vehicle. Each of the rails is secured between a pair of stanchions that elevate the rail above the roof. Typically, each stanchion includes a base or stay that is secured to the roof by bolts, screws or other fasteners. In order to protect the fasteners and provide the stanchion with a pleasing exterior appearance, a cover is usually disposed over the stay and is attached thereto by screws, bosses, tabs, snap-fits or other types of fasteners. The cover may be laterally disposed over the stay, such as disclosed in U.S. Pat. No. 5,765,737, or the cover may be vertically disposed over the stay, such as disclosed in U.S. Pat. Nos. 4,279,368; 5,016,799; and 5,573,159.

Usually, the cover is secured relative to the stay at two longitudinally spaced apart locations, one location being positioned at the juncture of the stanchion and the rail, and the other being positioned at an end of the stanchion distal to the rail. An example of such a fastening system is disclosed in U.S. Pat. No. 5,016,799, which discloses a cover having an end with a tongue extending therefrom that is received in a rail. An opposite end of the cover distal to the rail includes a plurality of tabs with shoulders that are engagedly received in slots of the base.

Another known base and cover system includes two attachment locations disposed at opposing ends of the stanchion, as well as a third attachment location that is positioned between the two end locations and toward a side of the stanchion. At the first attachment location, a tab of the cover is disposed in a rail, while at the second attachment location, one or more hooks on the cover engages an edge of the base. At the third attachment location, a tab extending from the cover is held by a spring member in the base. This base and cover system provides a more secure connection between the cover and the base than systems having only two longitudinally spaced apart attachment locations. In applications where the base and the cover have very low profiles, however, the force of the air stream flowing against the stanchion during movement of the vehicle may form a gap between the cover and the base on the side of the stanchion that is opposite to the third attachment point due to the thinness of the cover.

Accordingly, there is a need in the art for a roof rack cover attachment system and method that will prevent the formation of gaps between the cover and the base, even in applications where the base and the cover have low profiles. The present invention is directed to such a roof rack cover attachment system and method.

SUMMARY OF THE INVENTION

In accordance with the present invention, a rack assembly is provided for mounting to a vehicle. The rack assembly comprises a rail secured between first and second stanchions. The first stanchion includes a base for connection to the vehicle and a cover releasably secured over the base. The cover has an interior surface with a loop extending therefrom, while the base has an interior surface with a tongue extending therefrom. The hook extends into the loop to help secure the cover to the base.

BRIEF DESCRIPTION OF THE DRAWINGS

The features, aspects, and advantages of the present invention will become better understood with regard to the following description, appended claims, and accompanying drawings where:

FIG. 7 shows a loop of the cover disposed over a tongue of the stay.

DETAILED DESCRIPTION OF THE PREFERRED EMBODIMENTS

Figure 1:
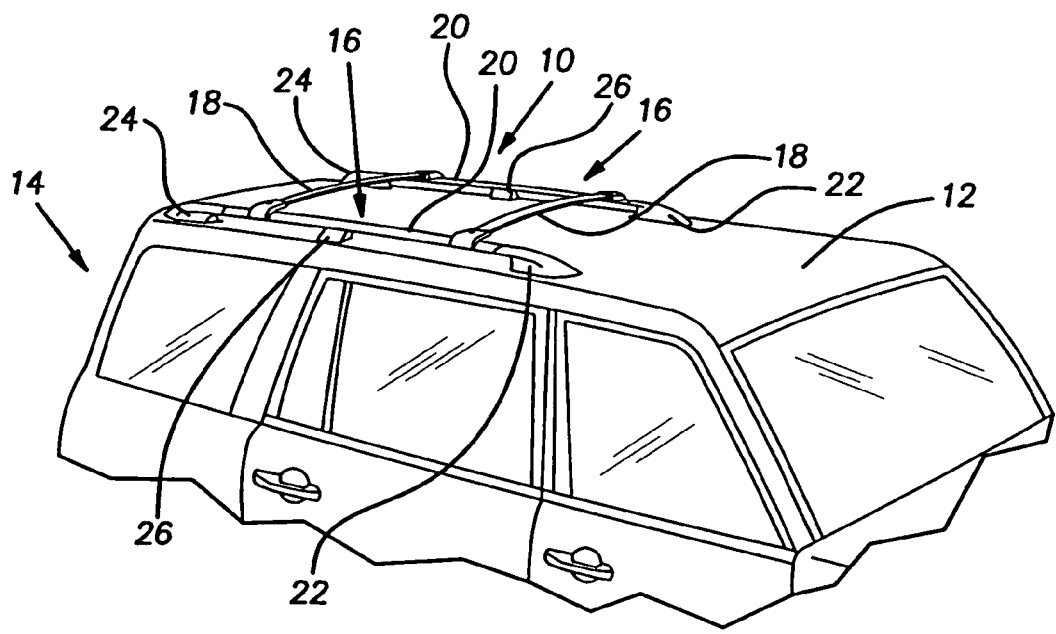
FIG. 1 shows a side perspective view of an upper portion of a vehicle having a roof with a roof rack secured thereto.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Referring now to FIG. 1, there is shown a roof rack 10 secured to a roof 12 of a vehicle 14, such as a sports utility vehicle. The roof rack 10 includes a pair of parallel, spaced-apart rail assemblies 16 extending longitudinally along a portion of the length of the roof 12. A pair of laterally-extending cross bars 18 may be secured between the rail assemblies 16. Each of the rail assemblies 16 includes a rail 20 secured between a low-profile front stanchion 22 and a rear stanchion 24. A middle stanchion 26 may also be provided for providing extra support for the rail 20. The rail 20 is elongated and is composed of a rigid material, such as aluminum or a rigid plastic. Openings 28 are formed in the end portions of the rail 20 for receiving mounting portions of the front and rear stanchions 22, 24, as will be described more fully below. The rail 20 may be hollow such that the openings 28 are connected by a passage, or the rail 20 may be solid, with the openings 28 only extending inward enough to accommodate the mounting portions of the front and rear stanchions 22, 24.

In the description that follows, only the front stanchions 22 are described in detail. The rear stanchions 24 have substantially the same general construction as the front stanchions 22. The rear stanchions 24, however, are not low profile. Therefore, it is not essential for the rear stanchions 24 to have the same cover fastening system as the front stanchions 22, which is to be described below. Nonetheless, in order to provide a more secure assembly, the rear stanchions 24 may have the same cover fastening system as the front stanchions 22.

Figure 2:
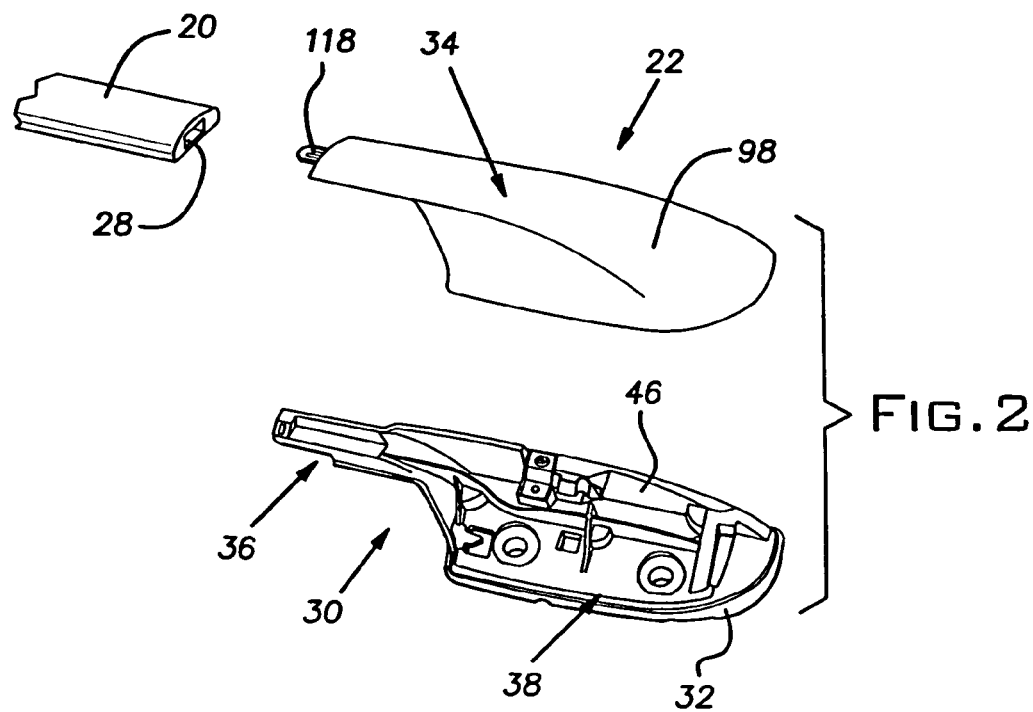
FIG. 2 shows an exploded view of a front portion of a rail assembly of the roof rack.

Referring now to FIG. 2, there is shown an exploded view of the front stanchion 22 of the rail assembly 16 mounted on the passenger side of the vehicle 14. The front stanchions 22 of the two rail assemblies 16 are mirror images of each other.

Thus, it should be understood that the following description of the front stanchion 22 for the passenger side rail assembly 16 is equally applicable to the front stanchion 22 for the driver side rail assembly 16, except for differences in position attributable to the two front stanchions 22 being mirror images. As shown in FIG. 2, the front stanchion 22 includes a base or stay 30, a gasket pad 32 and a cover 34.

Figure 3:
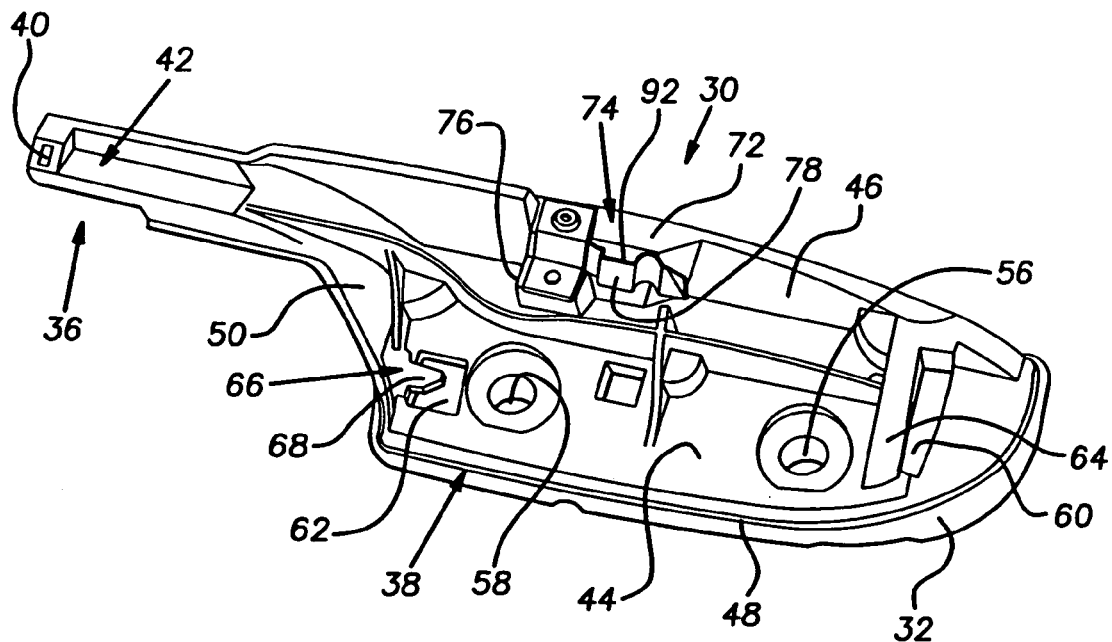
FIG. 3 shows a top perspective view of a stay of a front stanchion of the rail assembly.

Referring now to FIG. 3, the stay 30 is composed of a rigid material, such as aluminum, zinc, magnesium or a rigid plastic. Preferably, the stay 30 is composed of die cast zinc. The stay 30 is generally blade shaped and includes a neck portion 36 joined to a head portion 38. The neck portion 36 has an end wall 40 and a longitudinally-extending groove 42. The head portion 38 includes a bottom wall 44, an inner side wall 46, an arcuate outer edge 48 and a rear wall 50. Although not shown, front and rear mounting pillars extend downwardly from a bottom surface of the bottom wall 44. Front and rear countersunk holes 56, 58 are formed in the bottom wall 44 and are aligned with bores extending through the front and rear mounting pillars.

A generally rectangular front opening 60 is formed in the bottom wall 44, forward of the front countersunk hole 56, while a generally square rear opening 62 is formed in the bottom wall 44, rearward of the rear countersunk hole 58. A front catch member 64 slopes laterally downward from the inner side wall 46 to the bottom wall 44 and extends over the front opening 60 so as to define a catch space under a bottom surface of the front catch member 64. A tongue structure 66 is joined to the rear wall 50 and includes a generally planar tongue 68 that extends forwardly in cantilever fashion over the rear opening 62. The tongue 68 has a substantially straight inner edge and a beveled outer edge. A forward portion of the beveled edge extends forwardly and inwardly. It should be appreciated that the existence of the rear opening 62 below the tongue 68 permits the tongue 68 to be formed without using a slide during die casting of the stay 30 since the die is positioned normal to the bottom wall 44.

Figure 5:
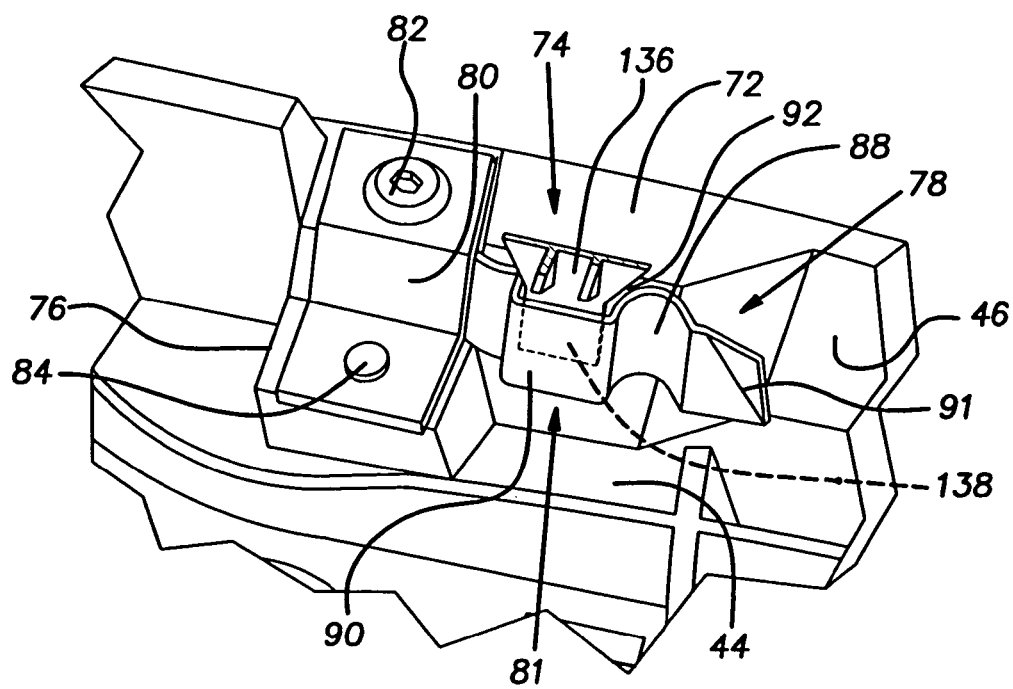
FIG. 5 shows a portion of a post fastening component of the cover being held by a spring of the stay.

Referring now also to FIG. 5. a body portion 72 of a generally L-shaped spring mount 74 is joined to the inner side wall 46. A shorter leg portion 76 of the spring mount 74 extends outwardly, toward the rear countersunk hole 58. A generally T-shaped metal spring 78 is secured to the spring mount 74 and includes a stepped crossbar 80 joined to an irregular-shaped body 81. The stepped crossbar 80 is secured to the body portion 72 and the leg portion 76 of the spring mount 74 by first and second fasteners 82, 84, respectively, which may screws, bosses, or other types of fasteners. The irregular-shaped body 81 of the spring 78 extends forwardly from the crossbar 80 and includes an arcuate section 88 disposed between a rearward channel section 90 and a forward free end 91. When the spring 78 is in a normal, undeflected position (as shown in FIGS. 3 and 5), the channel section 90 is spaced from the body portion 72 so as to define a slot 92 therebetween, while the arcuate section 88 is disposed against the body portion 72. An upper portion of the free end 91 is bent outwardly.

The gasket pad 32 has a periphery that conforms to the footprint of the stay 30. The gasket pad 32 is preferably composed of an elastomeric material, such as a solid thermoplastic olefin elastomer (TPO), or a rubber, such a ethylene propylene non-conjugated diene copolymer (EPDM) rubber. Preferably, the gasket pad 32 is composed of TPO. Although not shown, the gasket pad 32 includes a pair of openings through which the front and rear mounting pillars extend.

Figure 4:
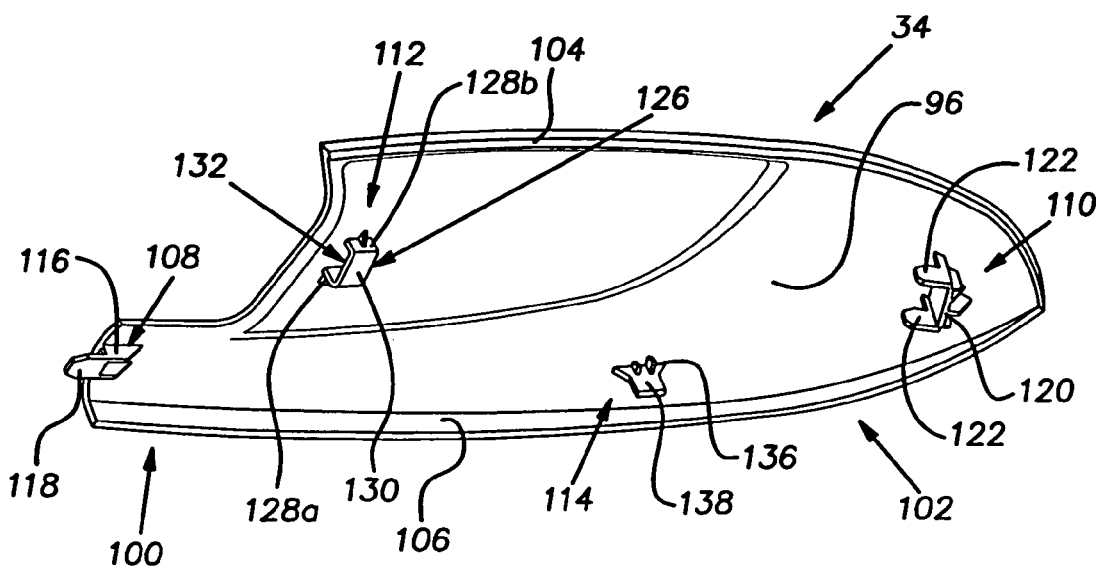
FIG. 4 shows a bottom perspective view of a cover of the front stanchion.

Referring back to FIG. 2 and now also to FIG. 4, the cover 34 is composed of a rigid material, preferably a rigid plastic, such as ABS (AcryInitril-Butadien-Styrol). The cover 34 has interior and exterior surfaces 96, 98. The exterior surface 98 is uninterrupted and has a pleasing aesthetic appearance. The cover 34 is shaped to cover the stay 30 and, thus, is generally blade shaped. The cover 34 includes a neck portion 100 and a head portion 102. An arcuate-shape outer flange 104 extends downwardly from an outer edge of the head portion 102, while an inner flange 106 extends downwardly from an inner edge of the neck and head portions 100, 102. A tab fastening component 108, a hook fastening component 110, a loop fastening component 112, and a post fastening component 114 are all joined to the interior surface 96 of the cover 34.

A base 116 of the tab fastening component 108 is joined to the interior surface 96 in the neck portion 100. A tab 118 of the tab fastening component 108 extends rearwardly from the base 116 and includes a beveled outer end that is spaced from a rear edge of the cover 34. As will be further discussed below, the tab fastening component 108 is positioned and shaped such that the tab 118 is disposed in the groove 42 of the neck portion 36 of the stay 30 and in the opening of the rail 20 when the cover 34 is secured over the stay 30.

Figure 6:
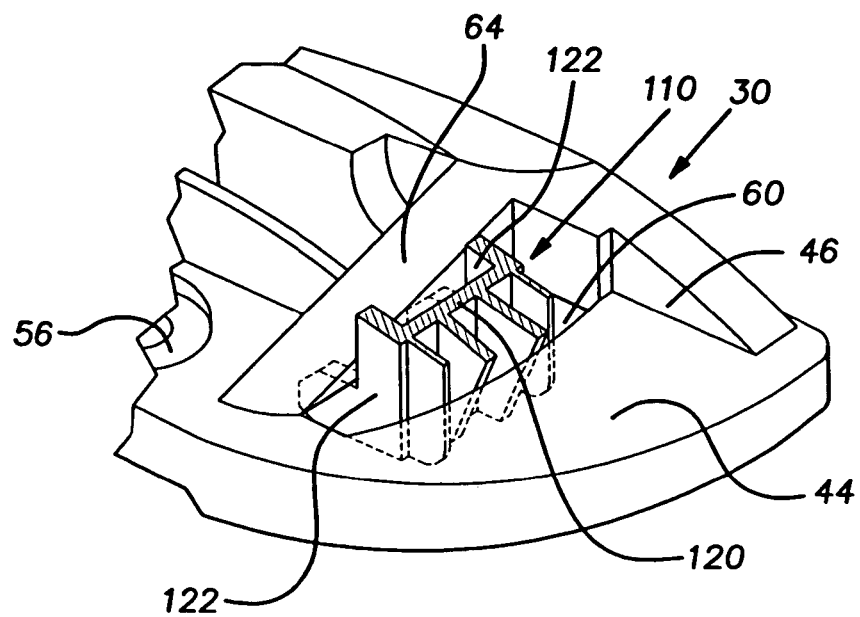
FIG. 6 shows a hook fastening component of the cover disposed in a catch space of the stay.

Referring now to FIGS. 4 and 6, the hook fastening component 110 is joined to the interior surface 96 of the cover 34, toward the front end thereof. The hook fastening component 110 includes a buttressed wall 120 extending downwardly from the interior surface 96. A pair of spaced-apart L-shaped hooks 122 is joined to the buttressed wall 120 and extends rearward therefrom. As will be further discussed below, the hook fastening component 110 is positioned and shaped such that the L-shaped hooks 122 are disposed in the catch space below the front catch member 64 of the stay 30 when the cover 34 is secured over the stay 30.

Referring now to FIGS. 4 and 7, the loop fastening component 112 includes a generally channel-shaped loop 126 having inner and outer legs 128a, b extending from the interior surface 96. The loop fastening component 112 is positioned toward a rear edge of the head portion 102 of the cover 34. A cross-member 130 is joined between lower ends of the inner and outer legs 128a, b. The loop 126 cooperates with the interior surface 96 of the cover 34 to define a passage 132 that extends in the direction of the rail 20 when the cover 34 is attached to the stay 30. The outer leg 128b is shorter than the inner leg 128a due to the slope of the cover 34 when it is secured to the stay 30. The inner and outer legs 128a, b may be supported by buttresses 134 joined to the interior surface 96 of the cover 34. As will be further discussed below, the loop fastening component 112 is positioned and shaped such that the passage 132 receives the tongue 68 of the tongue structure 66 of the stay 30 when the cover 34 is secured over the stay 30.

Referring now to FIGS. 4 and 5, the post fastening component 114 extends downwardly from the interior surface 96 of the cover 34 and is positioned toward the inner flange 106 of the cover 34. The post fastening component 114 includes an angled base 136 joined to a rectangular post 138. As will be further discussed below, the post fastening component 114 is positioned and shaped such that the post 138 is disposed in the slot 92 of the stay 30 when the cover 34 is secured over the stay 30.

The roof rack 10 is mounted to the vehicle 14 by first mounting the stays 30 of the front stanchions 22 (as well as the stays of the rear stanchions) to the rails 20 and then mounting the stays to brackets (not shown) secured to the roof 12. The covers are then attached the stays.

More specifically with regard to the stay 30 of each front stanchion 22, the neck portion of the stay 30 is inserted in the opening of the rail. The stay 30 is then positioned over a bracket secured to an exterior surface of the roof, such that the front and rear mounting pillars are aligned over a pair of mounting bolts extending upwardly from the bracket. The stay 30 is moved downwardly, causing the mounting bolts to extend into the bores in the front and rear mounting pillars. Elongated nuts are then inserted through the front and rear countersunk holes 56, 58 and are threadably engaged with the mounting bolts, thereby securing the stay 30 to the roof 12.

Referring back to FIG. 2, the cover 34 is attached to the stay 30 by positioning the cover 34 over the stay 30 so as to be aligned therewith, except for a small offset to the front of the stay 30. More specifically, the cover 34 is offset to the front of the stay 30 by an amount sufficient to: (i.) position the loop fastening component 112 in front of the tongue 68 of the tongue structure 66, (ii.) position the post fastening component 114 in front of the free end 91 of the spring 78, and (iii.) position the hook fastening component 110 in front of the front catch member 64. With the cover 34 so positioned, the cover 34 is then slid rearward, toward the rail 20. As the cover 34 slides rearward, the tab 118 slides through the groove 42 in the stay 30 and into the opening 28 in the rail 20, the loop 126 slides over the tongue 68 of the tongue structure 66 and the L-shaped hooks 122 slide into the catch space below the front catch member 64. With regard to the interaction between the loop 126 and the tongue 68, it should be appreciated that the beveled edge of the tongue 68 helps guide the loop 126 over the tongue 68 if the cover 34 is laterally offset a small amount. In addition to the foregoing, when the cover 34 slides rearward, the outwardly-bent portion of the free end 91 of the spring 78 guides the post 138 between the spring 78 and body portion 72 of the spring mount 74. As the cover 34 continues to move rearward, the post 138 travels between the arcuate section 88 and the body portion 72, thereby forcing the spring 78 to deflect outwardly. Further rearward movement of the cover 34 causes the post 138 to move between the channel section 90 and the body portion 72, which permits the spring 78 to resiliently move back to its normal position, thereby trapping the post 138 in the slot 92.

Referring now to FIG. 7, when the cover 34 is attached to the stay 30 in the manner described above, the tongue 68 of the tongue structure 66 is disposed in the passage 132 of the loop 126. As a result, the tongue 68 is trapped between the cross-member 130 and the interior surface 96 of the cover 34, thereby preventing the portion of the cover 34 over the loop fastening component 112 from moving vertically away from the stay 30. In this manner, the engagement of the loop fastening component 112 with the tongue structure 66 prevents a gap from forming between the stay 30 and the cover 34 on an outer side of the front stanchion 22.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A rack assembly for mounting to a vehicle, said rack assembly comprising: a rail secured between first and second stanchions;
wherein said first stanchion comprises a base for connection to the vehicle and a cover releasably secured over the base, said cover having an interior surface with a loop extending therefrom, said loop having an inner leg, an outer leg, and a cross member, said cross-member joining a distal end of the inner leg to a distal end of the outer leg to thereby define a passage between the cross-member and the interior surface of the cover, and said base having an interior surface with a tongue extending therefrom, said tongue extending into the passage to help secure the cover to the base,
wherein the passage extends in the direction of the rail,
wherein the tongue is generally planar and has a beveled edge, and
wherein the base further comprises a rear wall and a bottom wall with an opening formed therein, and wherein the tongue extends from the rear wall, over the opening.

2. The rack assembly of claim 1, wherein the cover further comprises a tab disposed in an opening in the rail.

3. The rack assembly of claim 2, wherein the cover further comprises a post extending from the interior surface of the cover, and wherein the base further comprises a spring that engages the post of the cover.

4. The rack assembly of claim 3, wherein the base further comprises a catch member, and wherein the cover further comprises at least one hook that engages the catch member of the base.

5. The rack assembly of claim 4, wherein the cover is releasably secured to the base by sliding the cover over the base in the direction of the rail.

6. The rack assembly of claim 4, wherein the at least one hook comprises a pair of hooks, and wherein the hooks are L-shaped.

7. A rack assembly for mounting to a vehicle, said rack assembly comprising:
a rail secured between first and second stanchions, wherein said first stanchion comprises:
a base for connection to the vehicle, said base including a cantilever-mounted tongue, a spring, and a catch member; and
a cover disposed over the base, said cover including a loop, a post, and at least one hook;
wherein the loop vertically extends from an interior surface of the cover toward the base and includes an inner leg, an outer leg and a cross-member,
wherein the cross-member joins a distal end of the inner leg to a distal end of the outer leg to thereby define a passage between the cross-member and the interior surface of the cover,
wherein the tongue of the base is disposed in the passage of the cover to form a first fastener assembly, the post of the cover is held by the spring of the base to form a second fastener assembly, and the at least one hook is engaged with the catch member of the base to form a third fastener assembly, said first, second and third fastener assemblies being operable to releasably secure the cover to the base, and
wherein the base further comprises a rear wall and a bottom wall with an opening formed therein, and wherein the tongue extends from the rear wall, over the opening.

8. The rack assembly of claim 7, wherein the first stanchion has a low profile and is mounted toward the front of the roof.

9. The rack assembly of claim 7, wherein the cover further comprises a tab that is disposed in an opening in the end of the rail.

10. The rack assembly of claim 7, wherein the cover is attached to the base by sliding the cover over the base in the direction of the rail.

11. The rack assembly of claim 7, wherein the passage extends in the direction of the rail.

12. The rack assembly of claim 11, wherein the second fastener assembly is positioned between the first fastener assembly and the third fastener assembly in the direction of the rail.

13. The rack assembly of claim 11, wherein the second fastener assembly is spaced from the first fastener assembly in a direction perpendicular to the rail.

* * * * *